US008265928B2

(12) United States Patent
Kristjansson et al.

(10) Patent No.: US 8,265,928 B2
(45) Date of Patent: Sep. 11, 2012

(54) GEOTAGGED ENVIRONMENTAL AUDIO FOR ENHANCED SPEECH RECOGNITION ACCURACY

(75) Inventors: Trausti Kristjansson, Hartsdale, NY (US); Matthew I. Lloyd, Cambridge, MA (US)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 12/760,147

(22) Filed: Apr. 14, 2010

(65) Prior Publication Data

US 2011/0257974 A1    Oct. 20, 2011

(51) Int. Cl.
G10L 21/02    (2006.01)
G10L 15/00    (2006.01)
(52) U.S. Cl. .................... 704/227; 704/251; 704/226
(58) Field of Classification Search .................. 704/226, 704/227, 251
See application file for complete search history.

(56) References Cited

U.S. PATENT DOCUMENTS

| | | | |
|---|---|---|---|
| 6,778,959 B1 * | 8/2004 | Wu et al. ................ | 704/256 |
| 6,839,670 B1 * | 1/2005 | Stammler et al. ........... | 704/251 |
| 6,876,966 B1 * | 4/2005 | Deng et al. ................. | 704/233 |
| 6,950,796 B2 * | 9/2005 | Ma et al. ................... | 704/244 |
| 6,959,276 B2 * | 10/2005 | Droppo et al. ............. | 704/226 |
| 7,257,532 B2 * | 8/2007 | Toyama ..................... | 704/243 |
| 7,392,188 B2 * | 6/2008 | Junkawitsch et al. ...... | 704/251 |
| 7,424,426 B2 * | 9/2008 | Furui et al. ................ | 704/250 |
| 7,451,085 B2 * | 11/2008 | Rose et al. ................. | 704/244 |
| 7,941,189 B2 * | 5/2011 | Miyauchi ................. | 455/569.2 |
| 7,996,220 B2 * | 8/2011 | Rose et al. ................. | 704/244 |
| 2003/0236099 A1 | 12/2003 | Deisher et al. | |
| 2004/0138882 A1 | 7/2004 | Miyazawa | |
| 2004/0230420 A1 | 11/2004 | Kadambe et al. | |
| 2005/0187763 A1 | 8/2005 | Arun | |
| 2005/0216273 A1 | 9/2005 | Reding et al. | |
| 2008/0027723 A1 | 1/2008 | Reding et al. | |
| 2008/0091435 A1 | 4/2008 | Strope et al. | |
| 2008/0091443 A1 | 4/2008 | Strope et al. | |
| 2008/0188271 A1 | 8/2008 | Miyauchi | |
| 2008/0221887 A1 | 9/2008 | Rose et al. | |
| 2009/0030687 A1 | 1/2009 | Cerra et al. | |
| 2009/0271188 A1 | 10/2009 | Agapi et al. | |
| 2011/0137653 A1 | 6/2011 | Ljolje et al. | |

OTHER PUBLICATIONS

International Search Report and Written Opinion for International Application No. PCT/US2011/029407, mailed Jun. 7, 2011, 10 pages.
Bocchieri et al., "Use of geographical meta-data in ASR language and acoustic models", Acoustics Speech and Signal Processing (ICASSP), 2010 IEEE International Conference on IEEE, Mar. 14, 2010, pp. 5118-5121.
International Search Report from related PCT Application No. PCT/US2011/037558, dated Jul. 29, 2011.

* cited by examiner

*Primary Examiner* — Talivaldis Ivars Smits
(74) *Attorney, Agent, or Firm* — Fish & Richardson P.C.

(57) ABSTRACT

Methods, systems, and apparatus, including computer programs encoded on a computer storage medium, for enhancing speech recognition accuracy. In one aspect, a method includes receiving geotagged audio signals that correspond to environmental audio recorded by multiple mobile devices in multiple geographic locations, receiving an audio signal that corresponds to an utterance recorded by a particular mobile device, determining a particular geographic location associated with the particular mobile device, generating a noise model for the particular geographic location using a subset of the geotagged audio signals, where noise compensation is performed on the audio signal that corresponds to the utterance using the noise model that has been generated for the particular geographic location.

21 Claims, 4 Drawing Sheets

GEOTAGGED ENVIRONMENTAL AUDIO FOR ENHANCED SPEECH RECOGNITION ACCURACY

BACKGROUND

This specification relates to speech recognition.

As used by this specification, a "search query" includes one or more query terms that a user submits to a search engine when the user requests the search engine to execute a search query, where a "term" or a "query term" includes one or more whole or partial words, characters, or strings of characters. Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

Among other approaches, a user may enter query terms of a search query by typing on a keyboard or, in the context of a voice query, by speaking the query terms into a microphone of a mobile device. When submitting a voice query, the microphone of the mobile device may record ambient noises or sounds, or "environmental audio," in addition to spoken utterances of the user. For example, environmental audio may include background chatter or babble of other people situated around the user, or noises generated by nature (e.g., dogs barking) or man-made objects (e.g., office, airport, or road noise, or construction activity). The environmental audio may partially obscure the voice of the user, making it difficult for an automated speech recognition ("ASR") engine to accurately recognize spoken utterances.

SUMMARY

In general, one innovative aspect of the subject matter described in this specification may be embodied in methods for adapting, training, selecting or otherwise generating, by an ASR engine, a noise model for a geographic area, and for applying this noise model to "geotagged" audio signals (or "samples," or "waveforms") that are received from a mobile device that is located in or near this geographic area. As used by this specification, "geotagged" audio signals refer to signals that have been associated, or "tagged," with geographical location metadata or geospatial metadata. Among other things, the location metadata may include navigational coordinates, such as latitude and longitude, altitude information, bearing or heading information, or a name or an address associated with the location.

In further detail, the methods include receiving geotagged audio signals that correspond to environmental audio recorded by multiple mobile devices in multiple geographic locations, storing the geotagged audio signals, and generating a noise model for a particular geographic region using a selected subset of the geotagged audio signals. Upon receiving an utterance recorded by a mobile device within or near the same particular geographic area, the ASR engine may perform noise compensation on the audio signal using the noise model that is generated for the particular geographic region, and may perform speech recognition on the noise-compensated audio signal. Notably, the noise model for the particular geographic region may be generated before, during, or after receipt of the utterance.

In general, another innovative aspect of the subject matter described in this specification may be embodied in methods that include the actions of receiving geotagged audio signals that correspond to environmental audio recorded by multiple mobile devices in multiple geographic locations, receiving an audio signal that corresponds to an utterance recorded by a particular mobile device, determining a particular geographic location associated with the particular mobile device, generating a noise model for the particular geographic location using a subset of the geotagged audio signals, where noise compensation is performed on the audio signal that corresponds to the utterance using the noise model that has been generated for the particular geographic location.

Other embodiments of these aspects include corresponding systems, apparatus, and computer programs, configured to perform the actions of the methods, encoded on computer storage devices.

These and other embodiments may each optionally include one or more of the following features. In various examples, speech recognition is performed on the utterance using the noise-compensated audio signal; generating the noise model further includes generating the noise model before receiving the audio signal that corresponds to the utterance; generating the noise model further includes generating the noise model after receiving the audio signal that corresponds to the utterance; for each of the geotagged audio signals, a distance between the particular geographic location and a geographic location associated the geotagged audio signal is determined, and the geotagged audio signals that are associated with geographic locations which are within a predetermined distance of the particular geographic location, or that are associated with geographic locations which are among the N closest geographic locations to the particular geographic location, are selected as the subset of the geotagged audio signals; the geotagged audio signals that are associated with the particular geographic location are selected as the subset of the geotagged audio signals; the subset of the geotagged audio signals are selected based on the particular geographic location, and based on context data associated with the utterance; the context data includes data that references a time or a date when the utterance was recorded by the mobile device, data that references a speed or an amount of motion measured by the particular mobile device when the utterance was recorded, data that references settings of the mobile device, or data that references a type of the mobile device; the utterance represents a voice search query, or an input to a digital dictation application or a dialog system; determining the particular geographic location further includes receiving data referencing the particular geographic location from the mobile device; determining the particular geographic location further includes determining a past geographic location or a default geographic location associated with the device; generating the noise model includes training a Gaussian Mixture Model (GMM) using the subset of the geotagged audio signals as a training set; one or more candidate transcriptions of the utterance are generated, a search query is executed using the one or more candidate transcriptions; the received geotagged audio signals are processed to exclude portions of the environmental audio that include voices of users of the multiple mobile devices; the noise model generated for the particular geographic location is selected from among multiple noise models generated for the multiple geographic locations; an area surrounding the particular geographic location is defined, a plurality of noise models associated with geographic locations within the area are selected from among the multiple noise models, a weighted combination of the selected noise models is generated, where the noise compensation is performed using the weighted combination of selected noise models; generating the noise model further includes generating the noise model for the particular geographic location using the subset of the geotagged audio signals and using an environmental audio portion of the audio signal that corresponds to the utterance; and/or an area is defined surrounding the particular geographic location, and the geotagged audio signals recorded within the area are selected as the subset of the geotagged audio signals.

Particular embodiments of the subject matter described in this specification may be implemented to realize one or more of the following advantages. The ASR engine may provide for better noise suppression of the audio signal. Speech recognition accuracy may be improved. Noise models may be generated using environmental audio signals that accurately reflect the actual ambient noise in a geographic area. Speech recognition and noise model generation may be performed at the server side, instead of on the client device, to allow for better process optimization and to increase computational efficiency.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
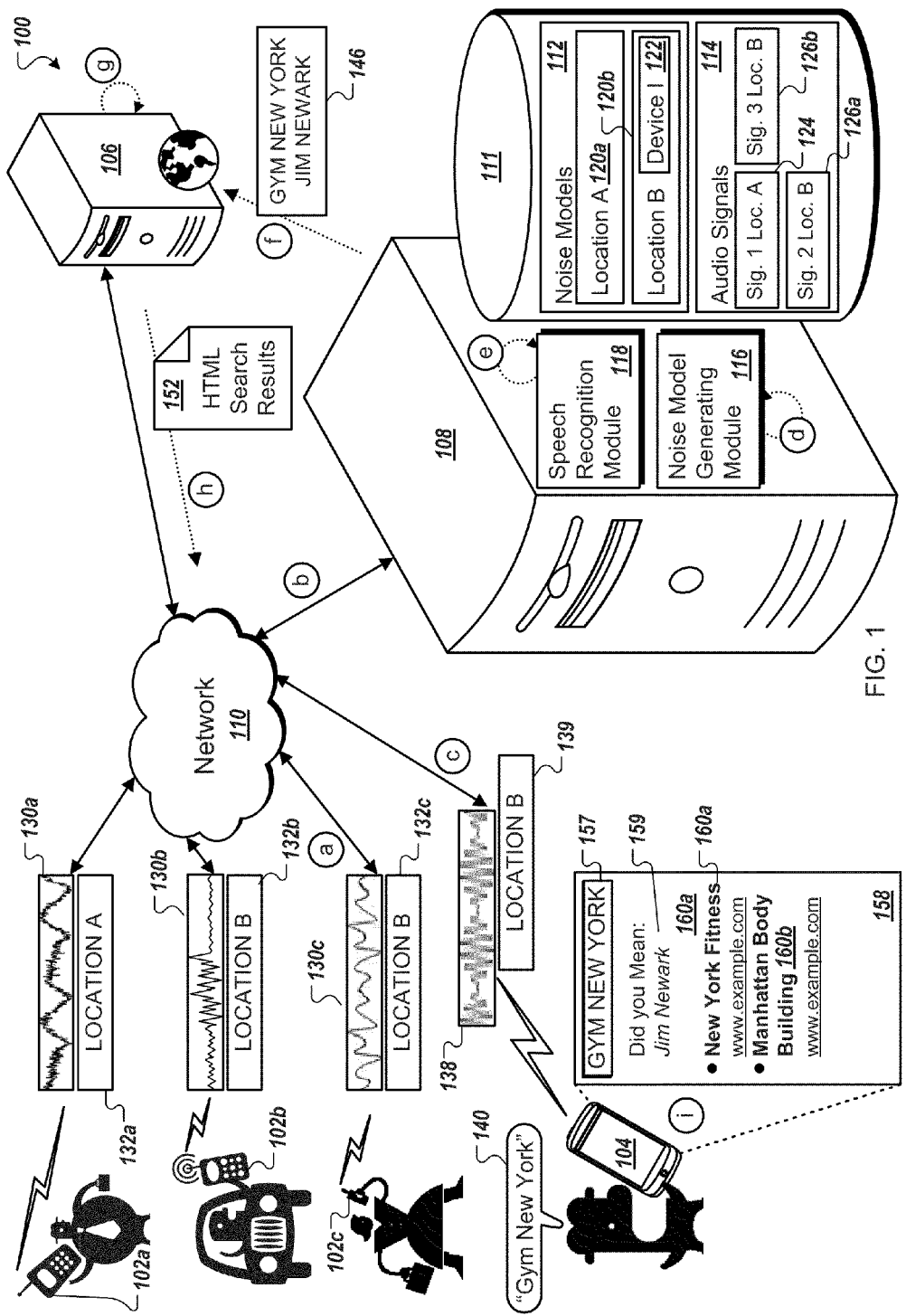
FIG. 1 is a diagram of an example system that uses geotagged environmental audio to enhance speech recognition accuracy.

FIG. 1 is a diagram of an example system 100 that uses geotagged environmental audio to enhance speech recognition accuracy. FIG. 1 also illustrates a flow of data within the system 100 during states (a) to (i), as well as a user interface 158 that is displayed on a mobile device 104 during state (i).

In more detail, the system 100 includes a server 106 and an ASR engine 108, which are in communication with mobile client communication devices, including mobile devices 102 and the mobile device 104, over one or more networks 110. The server 106 may be a search engine, a dictation engine, a dialogue system, or any other engine or system that uses transcribed speech. The networks 110 may include a wireless cellular network, a wireless local area network (WLAN) or Wi-Fi network, a Third Generation (3G) or Fourth Generation (4G) mobile telecommunications network, a private network such as an intranet, a public network such as the Internet, or any appropriate combination thereof.

The states (a) through (i) depict a flow of data that occurs when an example process is performed by the system 100. The states (a) to (i) may be time-sequenced states, or they may occur in a sequence that is different than the illustrated sequence.

Briefly, according the example process illustrated in FIG. 1, the ASR engine 108 receives geotagged, environmental audio signals 130 from the mobile devices 102 and generates geo-specific noise models 112 for multiple geographic locations. When an audio signal 138 that corresponds to an utterance recorded by the mobile device 104 is received, a particular geographic location associated with the mobile device 104 (or the user of the mobile device 104) is determined. The ASR engine 108 transcribes the utterance using the geo-specific noise model that matches, or that is otherwise suitable for, the particular geographic location, and one or more candidate transcriptions 146 are communicated from the ASR engine 108 to the server 106. Where the server 106 is a search engine, the server 106 executes one or more search queries using the candidate transcriptions 146, generates search results 152, and communicates the search results 152 to the mobile device 104 for display.

In more detail, during state (a), the mobile devices 102 communicate geotagged audio signals 130 that include environmental audio (referred to by this specification as "environmental audio signals") to the ASR engine 108 over the networks 110. In general, environmental audio may include any ambient sounds that occur (naturally or otherwise) at a particular location. Environmental audio typically excludes the sounds, utterances, or voice of the user of the mobile device.

The device 102a communicates an audio signal 130a that has been tagged with metadata 132a that references "Location A," the device 102b communicates an audio signal 130b that has been tagged with metadata 132b that references "Location B," and the device 102c communicates an audio signal 130c that has been tagged with metadata 132c that also references "Location B." The metadata 132 may be associated with the audio signals 130 by mobile devices 102, as illustrated, or the metadata may be associated with the audio signals 130 by the ASR engine 108 or by another server after inferring a location of a mobile device 102 (or of the user of the mobile device 102).

The environmental audio signals 130 may each include a two-second (or more) snippet of relatively high quality audio, such as sixteen kilohertz lossless audio signals. The environmental audio signals 130 may be associated with metadata that references the geographic location of the respective mobile device 102 when the environmental audio was recorded, captured or otherwise obtained.

The environmental audio signals 130 may be manually uploaded from the mobile devices 102 to the ASR engine 108. For instance, environmental audio signals 130 may be generated and communicated in conjunction with the generation and communication of images to a public image database or repository. Alternatively, for users who opt to participate, environmental audio signals 130 may be automatically obtained and communicated from the mobile devices 102 to the ASR engine 108 without requiring an explicit, user actuation before each environmental audio signal is communicated to the ASR engine 108.

The metadata 132 may describe locations in any number of different formats or levels of detail or granularity. For example, the metadata 132a may include a latitude and longitude associated with the then-present location of the mobile device 102a, and the metadata 132c may include an address or geographic region associated with the then-present location of the mobile device 102c. Furthermore, since the mobile device 102b is illustrated as being in a moving vehicle, the metadata 132b may describe a path of the vehicle (e.g., including a start point and an end point, and motion data). Additionally, the metadata 132 may describe locations in terms of location type (e.g., "moving vehicle," "on a beach," "in a restaurant," "in tall building," "South Asia," "rural area," "someplace with construction noise," "amusement park," "on a boat," "indoors," "underground," "on a street," "forest"). A single audio signal may be associated with metadata that describes one or more locations.

The geographic location associated with the audio signal 138 may instead be described in terms of a bounded area, expressed as a set of coordinates that define the bounded area. Alternatively, the geographic location may be defined using a region identifier, such as a state name or identifier, city name, idiomatic name (e.g., "Central Park"), a country name, or the identifier of arbitrarily defined region (e.g., "cell/region ABC123").

Before associating a location with the environmental audio signal, the mobile devices 102 or the ASR engine 108 may process the metadata to adjust the level of detail of the location information (e.g., to determine a state associated with a particular set of coordinates), or the location information may be discretized (e.g., by selecting a specific point along the path, or a region associated with the path). The level of detail of the metadata may also be adjusted by specifying or adding location type metadata, for example by adding an "on the beach" tag to an environmental audio signal whose associated geographic coordinates are associated with a beach location, or by adding a "someplace with lots of people" tag to an environmental audio signal that includes the sounds of multiple people talking in the background.

During state (b), the ASR engine 108 receives the geotagged environmental audio signals 130 from the mobile devices 102, and stores the geotagged audio signals (or portions thereof) in the collection 114 of environmental audio signals, in the data store 111. As described below, the collection is used for training, adapting, or otherwise generating one or more geographic location-specific (or "geo-specific") noise models 112.

Because environmental audio signals in the collection 114 should not include users' voices, the ASR engine 108 may use a voice activity detector to verify that the collection 114 of environmental audio signals only includes audio signals 130 that correspond to ambient noise, or to filter out or otherwise identify or exclude audio signals 130 (or portions of the audio signals 130) that include voices of the various users of the mobile devices 102.

The collection 114 of the ambient audio signals stored by the ASR engine 108 may include hundreds, thousands, millions, or hundreds of millions of environmental audio signals. In the illustrated example, a portion or all of the geo-tagged environmental audio signal 130a may be stored in the collection 114 as the environmental audio signal 124, a portion or all of the geo-tagged environmental audio signal 130b may be stored in the collection 114 as the environmental audio signal 126a, and a portion or all of the geotagged environmental audio signal 130c may be stored in the collection 114 as the environmental audio signal 120b.

Storing an environmental audio signal 130 in the collection may include determining whether a user's voice is encoded in the audio signal 130, and determining to store or determining not to store the environmental audio signal 130 in the collection based on determining that the user's voice is or is not encoded in the audio signal 130, respectively. Alternatively, storing an environmental audio signal in the collection may include identifying a portion of the environmental audio signal 130 that includes the user's voice, altering the environmental audio signal 130 by removing the portion that includes the user's voice or by associating metadata which references the portion that includes the user's voice, and storing the altered environmental audio signal 130 in the collection.

Other context data or metadata associated with the environmental audio signals 130 may be stored in the collection 114 as well. For example, the environmental audio signals included in the collection 114 can, in some implementations, include other metadata tags, such as tags that indicate whether background voices (e.g., cafeteria chatter) are present within the environmental audio, tags that identify the date on which a particular environmental audio signal was obtained (e.g., used to determine a sample age), or tags that identify whether a particular environmental audio signal deviates in some way from other environmental audio signals of the collection that were obtained in the same or similar location. In this manner, the collection 114 of environmental audio signals may optionally be filtered to exclude particular environmental audio signals that satisfy or that do not satisfy particular criteria, such as to exclude particular environmental audio signals that are older than a certain age, or that include background chatter that may identify an individual or otherwise be proprietary or private in nature.

In an additional example, data referencing whether the environmental audio signals of the collection 114 were manually or automatically uploaded may be tagged in metadata associated with the environmental audio signals. For example, some of the noise models 112 may be generated using only those environmental audio signals that were automatically uploaded, or that were manually uploaded, or different weightings may be assigned to each category of upload during the generating of the noise models.

Although the environmental audio signals of the collection 114 have been described as including an explicit tag that identifies a respective geographic location, in other implementations, such as where the association between an audio signal and a geographic location may be derived, the explicit use of a tag is not required. For example, a geographic location may be implicitly associated with an environmental audio signal by processing search logs (e.g., stored with the server 106) to determine geographic location information for a particular environmental audio signal. Accordingly, receipt of a geo-tagged environmental audio signals by the ASR engine 108 may include obtaining an environmental audio signal that does not expressly include a geo-tag, and deriving and associating one or more geo-tags for the environmental audio signal.

During state (c), an audio signal 138 is communicated from the mobile device 104 to the ASR engine 108 over the networks 110. Although the mobile device 102 is illustrated as being different than a different device than the mobile devices 104, in other implementations the audio signal 138 is communicated from one of the mobile devices 104 that provided an geo-tagged environmental audio signal 130.

The audio signal 138 includes an utterance 140 ("Gym New York") recorded by the mobile device 104 (e.g., when the user implicitly or explicitly initiates a voice search query). The audio signal 138 includes metadata 139 that references the geographic location "Location B." In addition to including the utterance 140, the audio signal 138 may also include a snippet of environmental audio, such as a two second snippet of environmental audio that was recorded before or after the utterance 140 was spoken. While the utterance 140 is described an illustrated in FIG. 1 as a voice query, in other example implementations the utterance may be an voice input to dictation system or to a dialog system.

The geographic location ("Location B") associated with the audio signal 138 may be defined using a same or different level of detail as the geographic locations associated with the environmental audio signals included in the collection 114. For example, the geographic locations associated with the environmental audio signals included in the collection 114 may correspond to geographic regions, while the geographic location associated with the audio signal 138 may correspond to a particular geographic coordinate. Where the level of detail is different, the ASR engine 108 may process the geographic metadata 139 or the metadata associated with the environmental audio signals of the collection 114 to align the level of detail, so that a subset selection process can be performed.

The metadata 139 may be associated with the audio signal 138 by the mobile device 104 (or the user of the mobile device 104) based on location information that is current when the utterance 140 is recorded, and may be communicated with the audio signal 138 from the mobile device 104 to the ASR engine 108. Alternatively, the metadata may be associated with the audio signal 138 by the ASR engine 108, based on a geographic location that the ASR engine 108 infers for the mobile device 104 (or the user of the mobile device 104).

The ASR engine 108 may infer the geographic location using the user's calendar schedule, user preferences (e.g., as stored in a user account of the ASR engine 108 or the server 106, or as communicated from the mobile device 104), a default location, a past location (e.g., the most recent location calculated by a GPS module of the mobile device 104), information explicitly provided by the user when submitting the voice search query, from the utterances 104 themselves, triangulation (e.g., WiFi or cell tower triangulation), a GPS module in the mobile device 104, or dead reckoning. The metadata 139 may include accuracy information that specifies an accuracy of the geographic location determination, signifying a likelihood that the mobile device 104 was actually in the particular geographic location specified by the metadata 139 at the time when the utterance 140 was recorded.

Other metadata may also be included with the audio signal 138. For example, metadata included with the audio signals may include a location or locale associated with the respective mobile device 102. For example, the locale information may describe, among other selectable parameters, a region in which the mobile device 102 is registered, or the language or dialect of the user of the mobile device 102. The speech recognition module 118 may use this information to select, train, adapt, or otherwise generate noise, speech, acoustic, popularity, or other models that match the context of the mobile device 104.

In state (d), the ASR engine 108 selects a subset of the environmental audio signals in the collection 114, and uses a noise model generating module 116 to train, adapt, or otherwise generate one or more noise models 112 (e.g., Gaussian Mixture Models (GMMs)) using the subset of the environmental audio signals, for example by using the subset of the environmental audio signals as a training set for the noise model. The subset may include all, or fewer than all of the environmental audio signals in the collection 114.

In general, the noise models 112, along with speech models, acoustic models, popularity models, and/or other models, are applied to the audio signal 138 to translate or transcribe the spoken utterance 140 into one or more textual, candidate transcriptions 146, and to generate speech recognition confidence scores to the candidate transcriptions. The noise models, in particular, are used for noise suppression or noise compensation, to enhance the intelligibility of the spoken utterance 140 to the ASR engine 108.

In more detail, the noise model generating module 116 may generate a noise model 120*b* for the geographic location ("Location B") associated with the audio signal 138 using the collection 114 of audio signals, specifically the environmental audio signals 126*a* and 126*b* that were geotagged as having been recorded at or near that geographic location, or at a same or similar type of location. Since the audio signal 138 is associated with this geographic location ("Location B"), the environmental audio included in the audio signal 138 itself may be used to generate a noise model for that geographic location, in addition to or instead of the environmental audio signals 126*a* and 126*b*. Similarly, the noise model generating module 116 may generate a noise model 120*a* for another geographic location ("Location A"), using the environmental audio signal 124 that was geotagged as having been recorded at or near that other geographic location, or at a same or similar type of location. If the noise model generating module 116 is configured to select environmental audio signal that were geotagged as having been recorded near the geographic location associated with the audio signal 138, and if "Location A" is near "Location B," the noise model generating module 116 may generate a noise model 120*b* for "Location B" also using the environmental audio signal 124.

In addition to the geotagged location, other context data associated with the environmental audio signals of the collection 114 may be used to select the subset of the environmental audio signals to use to generate the noise models 112, or to adjust a weight or effect that a particular audio signal is to have upon the generation. For example, the ASR engine 108 may select a subset of the environmental audio signals in the collection 114 whose contextual information indicates that they are longer than or shorter than a predetermined period of time, or that they satisfy certain quality or recency criteria. Furthermore, the ASR engine 108 may select, as the subset, environmental audio signals in the collection 114 whose contextual information indicates that they were recorded using a mobile device that has a similar audio subsystem as the mobile device 104.

Other context data which may be used to select the subset of the environmental audio signals from the collection 114 may include, in some examples, the time information, date information, data referencing a speed or an amount of motion measured by the particular mobile device during recording, other device sensor data, device state data (e.g., Bluetooth headset, speaker phone, or traditional input method), a user identifier if the user opts to provide one, or information identifying the type or model of mobile device. The context data, for example, may provide an indication of conditions surrounding the recording of the audio signal 138.

In one example, context data supplied with the audio signal 138 by the mobile device 104 may indicate that the mobile device 104 is traveling at highway speeds along a path associated with a highway. The ASR 108 may infer that the audio signal 138 was recorded within a vehicle, and may select a subset of the environmental audio signals in the collection 114 that are associated with an "inside moving vehicle" location type. In another example, context data supplied with the audio signal 138 by the mobile device 104 may indicate that the mobile device 104 is in a rural area, and that the utterance 140 was recorded on a Sunday at 6:00 am. Based on this context data, the ASR 108 may infer that it accuracy of the speech recognition would not be improved if the subset included environmental audio signals that were recorded in urban areas during rush hour. Accordingly, the context data may be used by the noise model generating module 116 to filter the collection 114 of environmental audio signals when generating noise models 112, or by the speech recognition module 118 to select an appropriate noise model 112 for a particular utterance.

In some implementations, the noise model generating module 116 may select a weighted combination of the environmental audio signals of the collection 114 based upon the proximity of the geographic locations associated with the audio signals to the geographic location associated with the audio signal 138. The noise model generating module 116 may also generate the noise models 112 using environmental audio included in the audio signal 138 itself, for example environmental audio recorded before or after the utterances were spoken, or during pauses between utterances.

For instance, the noise model generating module 116 can first determine the quality of the environmental audio signals stored in the collection 114 relative to the quality of the environmental audio included in the audio signal 138, and can choose to generate a noise model using the audio signals stored in the collection 114 only, using the environmental audio included in the audio signal 138 only, or any appropriate weighted or unweighted combination thereof. For instance, the noise model generating module 116 may determine that the audio signal 138 includes an insignificant amount of environmental audio, or that high quality environmental audio is stored for that particular geographic location in the collection 114, and may choose to generate the noise model without using (or giving little weight to) the environmental audio included in the audio signal 138.

In some implementations, the noise model generating module 116 selects, as the subset, the environmental audio signals from the collection 114 that are associated with the N (e.g., five, twenty, or fifty) closest geographic locations to the geographic location associated with the audio signal 138. When the geographic location associated with the audio signal 138 describes a point or a place (e.g., coordinates), a geometric shape (e.g., a circle or square) may be defined relative to that that geographic location, and the noise model generating module 116 may select, as the subset, audio signals from the collection 114 that are associated with geographic regions that are wholly or partially located within the defined geometric shape.

If the geographic location associated with the audio signal 138 has been defined in terms of a location type (i.e., "on the beach," "city"), and ASR engine 108 may select environmental audio signals that are associated with a same or a similar location type, even if the physical geographic locations associated with the selected audio signals are not physically near the geographic location associated with the audio signal 138. For instance, a noise model for an audio signal that was recorded on the beach in Florida may be tagged with "on the beach" metadata, and the noise model generating module 116 may select, as the subset, environmental audio signals from the collection 114 whose associated metadata indicate that they were also recorded on beaches, despite the fact that they were recorded on beaches in Australia, Hawaii, or in Iceland.

The noise model generating module 116 may revert to selecting the subset based on matching location types, instead of matching actual, physical geographic locations, if the geographic location associated with the audio signal 138 does not match (or does not have a high quality match) with any physical geographic location associated with an environmental audio signal of the collection 114. Other matching processes, such as clustering algorithms, may be used to match audio signals with environmental audio signals.

In addition to generating general, geo-specific noise models 112, the noise model generating module 116 may generate geo-specific noise models that are targeted or specific to other criteria as well, such as geo-specific noise models that are specific to different device types or times of day. A targeted sub-model may be generated based upon detecting that a threshold criterion has been satisfied, such as determining that a threshold number of environmental audio signals of the collection 114 refer to the same geographic location, and share another same or similar context (e.g., time of day, day of the week, motion characteristics, device type, etc.).

The noise models 112 may be generated before, during, or after the utterance 140 has been received. For example, multiple environmental audio signals, incoming from a same or similar location as the utterance 140, may be processed in parallel with the processing of the utterance, and may be used to generate noise models 112 in real time or near real time, to better approximate the live noise conditions surrounding the mobile device 104.

In state (e), the speech recognition module 118 of the ASR engine 108 performs noise compensation on the audio signal 138 using the geo-specific noise model 120b for the geographic location associated with the audio signal 138, to enhance the accuracy of the speech recognition, and subsequently performs the speech recognition on the noise-compensated audio signal. When the audio signal 138 includes metadata that describes a device type of the mobile device 104, the ASR engine 108 may apply a noise model 122 that is specific to both the geographic location associated with the audio signal, and to the device type of the mobile device 104. The speech recognition module 118 may generate one or more candidate transcriptions 146 that match the utterance encoded in the audio signal 138, and speech recognition confidence values for the candidate transcriptions.

During state (f), one or more of the candidate transcriptions 146 generated by the speech recognition module 118 are communicated from the ASR engine 108 to the server 106. Where the server 106 is a search engine, the candidate transcriptions may be used as candidate query terms, to execute one or more search queries. The ASR engine 108 may rank the candidate transcriptions 146 by their respective speech recognition confidence scores before transmitting them to the server 106. By transcribing spoken utterances and providing candidate transcriptions to the server 106, the ASR engine 108 may provide a voice search query capability, a dictation capability, or a dialogue system capability to the mobile device 104.

The server 106 may execute one or more search queries using the candidate query terms, generates a file 152 that references search results 160. The server 106, in some examples, may include a web search engine used to find references within the Internet, a phone book type search engine used to find businesses or individuals, or another specialized search engine (e.g., a search engine that provides references to entertainment listings such as restaurants and movie theater information, medical and pharmaceutical information, etc.).

During state (h), the server 106 provides the file 152 that references the search results 160 to the mobile device 104. The file 152 may be a markup language file, such as an eXtensible Markup Language (XML) or HyperText Markup Language (HTML) file.

During state (i), the mobile device 104 displays the search results 160 on a user interface 158. Specifically, the user interface includes a search box 157 that displays the candidate query term with the highest speech recognition confidence score ("Gym New York"), an alternate query term suggestion region 159 that displays another of the candidate query term that may have been intended by the utterance 140 ("Jim Newark"), a search result 160a that includes a link to a resource for "New York Fitness" 160a, and a search result 160b that includes a link to a resource for "Manhattan Body Building" 160b. The search result 160a may further include a phone number link that, when selected, may be dialed by the mobile device 104.

Figure 2:
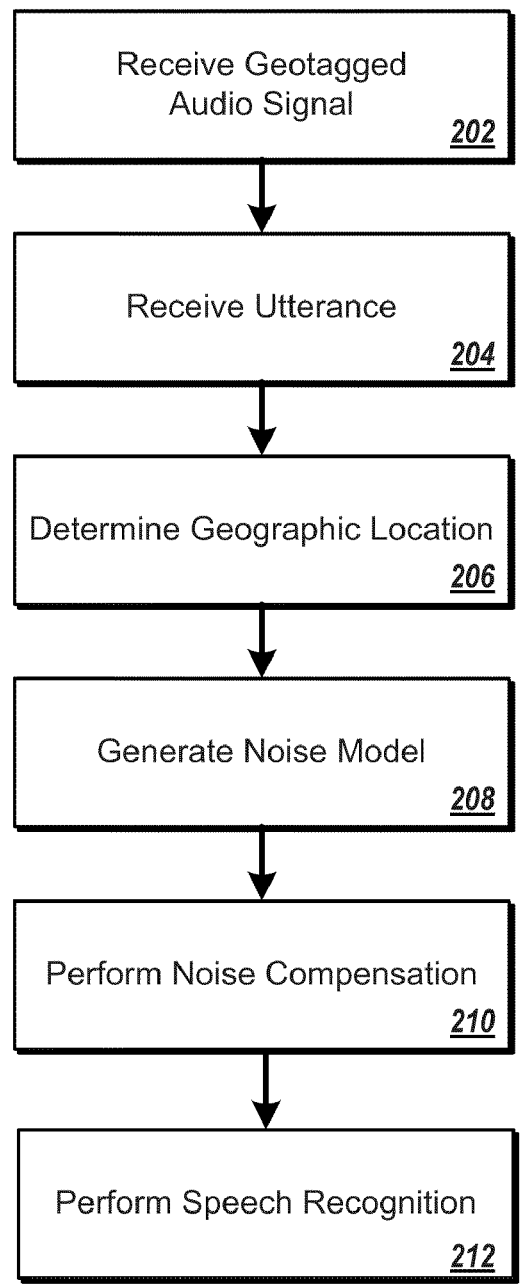
FIG. 2 is a flow chart of an example of a process.

FIG. 2 is a flowchart of an example of a process 200. Briefly, the process 200 includes receiving one or more geotagged environmental audio signals, receiving an utterance associated with a geographic location, and generating a noise model based in part upon the geographic location. Noise compensation may be performed on the audio signal, with the noise model contributing to improving an the accuracy of speech recognition.

In more detail, when process 200 begins, a geotagged audio signal corresponding to environmental audio is received (202). The geotagged audio signal may be recorded by a mobile device in a particular geographic location. The geotagged audio signal may include associated context data such as a time, date, speed, or amount of motion measured during the recording of the geotagged audio signal or a type of device which recorded the geotagged audio signal. The received geotagged audio signal may be processed to exclude portions of the environmental audio that include a voice of a user of the mobile device. Multiple geotagged audio signals recorded in one or more geographic locations may be received and stored.

An utterance recorded by a particular mobile device is received (204). The utterance may include a voice search query, or may be an input to a dictation or dialog application or system. The utterance may include associated context data such as a time, date, speed, or amount of motion measured during the recording of the geotagged audio signal or a type of device which recorded the geotagged audio signal.

A particular geographic location associated with the mobile device is determined (206). For example, data referencing the particular geographic location may be received from the mobile device, or a past geographic location or a default geographic location associated with the mobile device may be determined.

A noise model is generated for the particular geographic location using a subset of geotagged audio signals (208). The subset of geotagged audio signals may be selected by determining, for each of the geotagged audio signals, a distance between the particular geographic location and a geographic location associated the geotagged audio signal; and selecting those geotagged audio signals which are within a predetermined distance of the particular geographic location, or that are associated with geographic locations which are among the N closest geographic locations to the particular geographic location.

The subset of geotagged audio signals may be selected by identifying the geotagged audio signals associated with the particular geographic location, and/or by identifying the geotagged audio signals that are acoustically similar to the utterance. The subset of geotagged audio signals may be selected based both on the particular geographic location and on context data associated with the utterance.

Generating the noise model may include training a GMM using the subset of geotagged audio signals as a training set. Some noise reduction or separation algorithms, such as non-negative matrix factorization (NMF), can use the feature vectors themselves, not averages that are represented by the Gaussian components. Other algorithms, such as Alqonquin, can use either GMMs or the feature vectors themselves, with artificial variances.

Noise compensation is performed on the audio signal that corresponds to the utterance, using the noise model that has been generated for the particular geographic location, to enhance the audio signal or otherwise take decrease the uncertainty of the utterance due to noise (210).

Speech recognition is performed on the noise-compensated audio signal (212). Performing the speech recognition may include generating one or more candidate transcriptions of the utterance. A search query may be executed using the one or more candidate transcriptions, or one or more of the candidate transcriptions can be provided as an output of a digital dictation application. Alternatively, one or more of the candidate transcriptions may be provided as an input to a dialog system, to allow a computer system to converse with the user of the particular mobile device.

Figure 3:
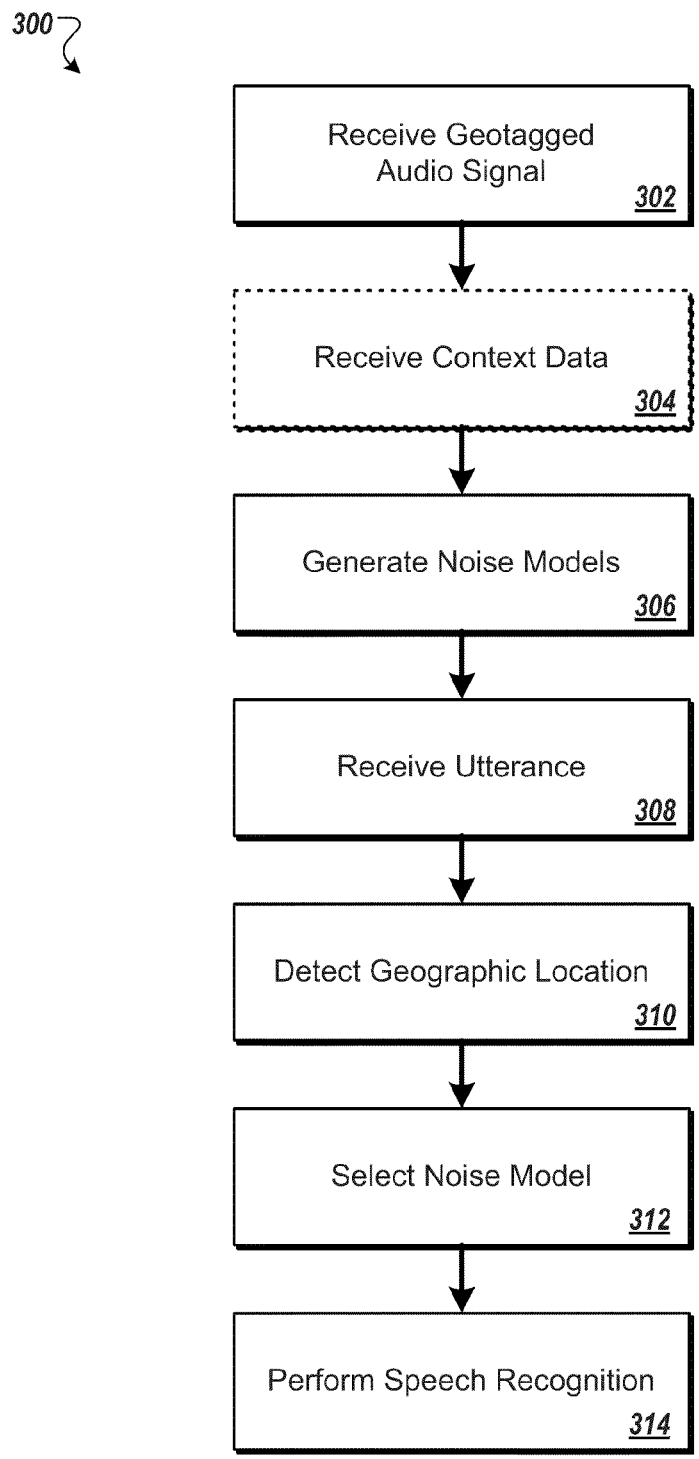
FIG. 3 is a flow chart of another example of a process.

FIG. 3 is a flowchart of an example of a process 300. Briefly, the process 300 includes collecting geotagged audio signals and generating multiple noise models based, in part, upon particular geographic locations associated with each of the geotagged audio signals. One or more of these noise models may be selected when performing speech recognition upon an utterance based, in part, upon a geographic location associated with the utterance.

In more detail, when process 300 begins, a geotagged audio signal corresponding to environmental audio is received (302). The geotagged audio signal may be recorded by a mobile device in a particular geographic location. The received geotagged audio signal may be processed to exclude portions of the environmental audio that include the voice of the user of the mobile device. Multiple geotagged audio signals recorded in one or more geographic locations may be received and stored.

Optionally, context data associated with the geotagged audio signal is received (304). The geotagged audio signal may include associated context data such as a time, date, speed, or amount of motion measured during the recording of the geotagged audio signal or a type of device which recorded the geotagged audio signal.

One or more noise models are generated (306). Each noise model may be generated for a particular geographic location or, optionally, a location type, using a subset of geotagged audio signals. The subset of geotagged audio signals may be selected by determining, for each of the geotagged audio signals, a distance between the particular geographic location and a geographic location associated the geotagged audio signal and selecting those geotagged audio signals which are within a predetermined distance of the particular geographic location, or that are associated with geographic locations which are among the N closest geographic locations to the particular geographic location. The subset of geotagged audio signals may be selected by identifying the geotagged audio signals associated with the particular geographic location. The subset of geotagged audio signals may be selected based both on the particular geographic location and on context data associated with the geotagged audio signals. Generating the noise model may include training a Gaussian Mixture Model (GMM) using the subset of geotagged audio signals.

An utterance recorded by a particular mobile device is received (308). The utterance may include a voice search query. The utterance may include associated context data such as a time, date, speed, or amount of motion measured during the recording of the geotagged audio signal or a type of device which recorded the geotagged audio signal.

A geographic location is detected (310). For example, data referencing the particular geographic location may be received from a GPS module of the mobile device.

A noise model is selected (312). The noise model may be selected from among multiple noise models generated for multiple geographic locations. Context data may optionally contribute to selection of a particular noise model among multiple noise models for the particular geographic location.

Speech recognition is performed on the utterance using the selected noise model (314). Performing the speech recognition may include generating one or more candidate transcriptions of the utterance. A search query may be executed using the one or more candidate transcriptions.

Figure 4:
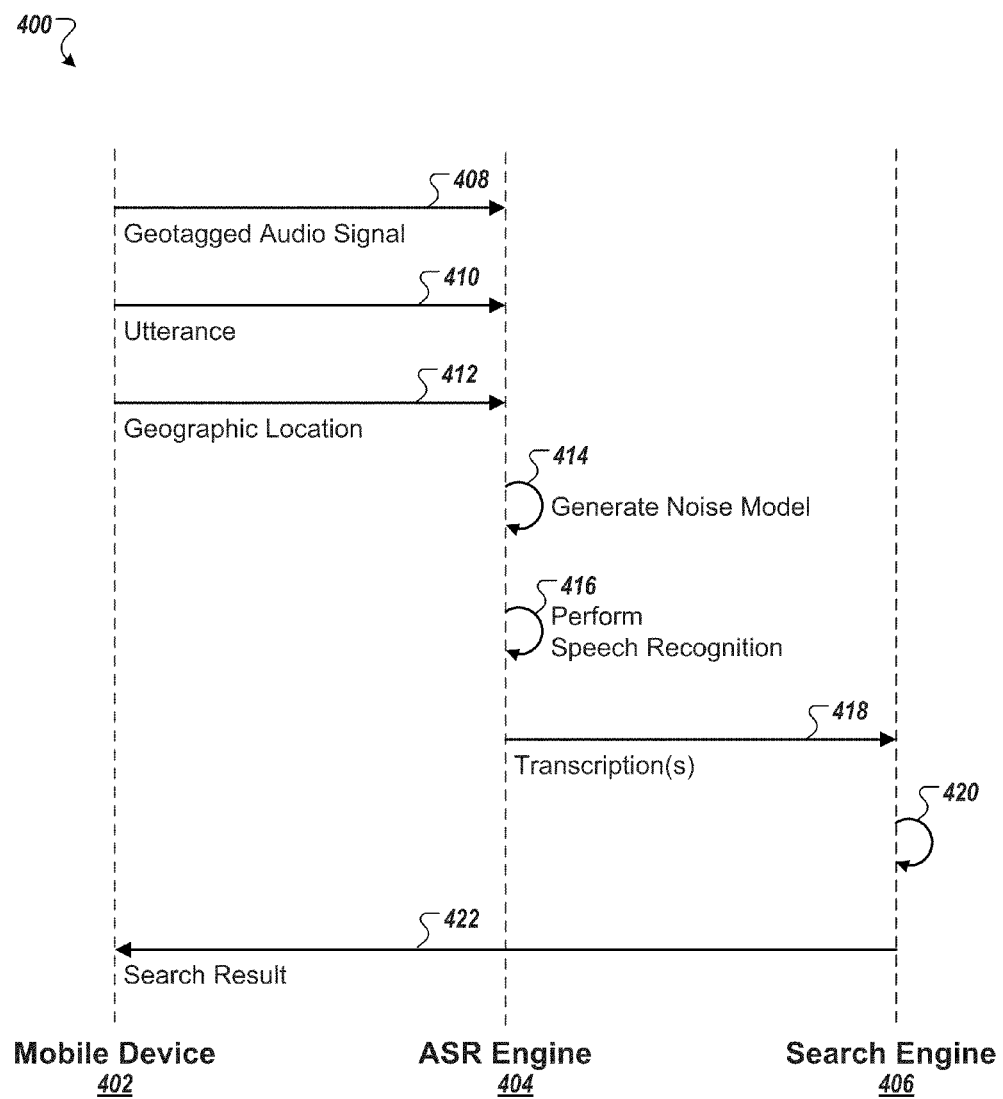
FIG. 4 is a swim lane diagram of an example of a process.

FIG. 4 shows a swim lane diagram of an example of a process 400 for enhancing speech recognition accuracy using geotagged environmental audio. The process 400 may be implemented by a mobile device 402, an ASR engine 404, and a search engine 406. The mobile device 402 may provide audio signals, such as environmental audio signals or audio signals that correspond to an utterance, to the ASR engine 404. Although only one mobile device 402 is illustrated, the mobile device 402 may represent a large quantity of mobile devices 402 contributing environmental audio signals and voice queries to the process 400. The ASR engine 404 may generate noise models based upon the environmental audio signals, and may apply one or more noise models to an incoming voice search query when performing speech recognition. The ASR engine 404 may provide transcriptions of utterances within a voice search query to the search engine 406 to complete the voice search query request.

The process 400 begins with the mobile device 402 providing 408 a geotagged audio signal to the ASR engine 404. The audio signal may include environmental audio along with an indication regarding the location at which the environmental audio was recorded. Optionally, the geotagged audio signal may include context data, for example in the form of metadata. The ASR engine 404 may store the geotagged audio signal in an environmental audio data store.

The mobile device 402 provides 410 an utterance to the ASR engine 404. The utterance, for example, may include a voice search query. The recording of the utterance may optionally include a sample of environmental audio, for example recorded briefly before or after the recording of the utterance.

The mobile device 402 provides 412 a geographic location to the ASR engine 404. The mobile device, in some examples, may provide navigational coordinates detected using a GPS module, a most recent (but not necessarily concurrent with recording) GPS reading, a default location, a location derived from the utterance previously provided, or a location estimated through dead reckoning or triangulation of transmission towers. The mobile device 402 may optionally provide context data, such as sensor data, device model identification, or device settings, to the ASR engine 404.

The ASR engine 404 generates 414 a noise model. The noise model may be generated, in part, by training a GMM. The noise model may be generated based upon the geographic location provided by the mobile device 402. For example, geotagged audio signals submitted from a location at or near the location of the mobile device 402 may contribute to a noise model. Optionally, context data provided by the mobile device 402 may be used to filter geotagged audio signals to select those most appropriate to the conditions in which the utterances were recorded. For example, the geotagged audio signals near the geographic location provided by the mobile device 402 may be filtered by a day of the week or a time of day. If a sample of environmental audio was included with the utterance provided by the mobile device 402, the environmental audio sample may optionally be included in the noise model.

The ASR engine 404 performs speech recognition 416 upon the provided utterance. Using the noise model generated by the ASR engine 404, the utterance provided by the mobile device 402 may be transcribed into one or more sets of query terms.

The ASR engine 404 forwards 418 the generated transcription(s) to the search engine 406. If the ASR engine 404 generated more than one transcription, the transcriptions may optionally be ranked in order of confidence. The ASR engine 404 may optionally provide context data to the search engine 406, such as the geographic location, which the search engine 406 may use to filter or rank search results.

The search engine 406 performs 420 a search operation using the transcription(s). The search engine 406 may locate one or more URIs related to the transcription term(s).

The search engine 406 provides 422 search query results to the mobile device 402. For example, the search engine 406 may forward HTML code which generates a visual listing of the URI(s) located.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A system comprising:
   one or more computers; and
   a computer-readable medium coupled to the one or more computers having instructions stored thereon which, when executed by the one or more computers, cause the one or more computers to perform operations comprising:
   receiving geotagged audio signals that correspond to environmental audio recorded by multiple mobile devices in multiple geographic locations,
   receiving an audio signal that corresponds to an utterance recorded by a particular mobile device,
   determining a particular geographic location associated with the particular mobile device,
   selecting, as a subset of the geotagged audio signals, the geotagged audio signals that are associated with the particular geographic location, and that were received from two or more of the multiple mobile devices within a predetermined period of time relative to when the utterance was recorded by the mobile device,
   generating a noise model for the particular geographic location using the subset of the geotagged audio signals, and
   performing noise compensation on the audio signal that corresponds to the utterance using the noise model that has been generated for the particular geographic location.

2. The system of claim 1, wherein the operations further comprise performing speech recognition on the utterance using the noise-compensated audio signal.

3. The system of claim 1, wherein generating the noise model further comprises generating the noise model before receiving the audio signal that corresponds to the utterance.

4. The system of claim 1, wherein generating the noise model further comprises generating the noise model after receiving the audio signal that corresponds to the utterance.

5. The system of claim 1, wherein selecting, as the subset of the geotagged audio signals, the geotagged audio signals that are associated with the particular geographic location further comprises:
  determining, for each of the geotagged audio signals, a distance between the particular geographic location and a geographic location associated with the geotagged audio signal; and
  selecting, as the subset of the geotagged audio signals, the geotagged audio signals that are associated with geographic locations which are within a predetermined distance of the particular geographic location, or that are associated with geographic locations which are among the N closest geographic locations to the particular geographic location.

6. The system of claim 1, wherein selecting, as the subset of the geotagged audio signals, the geotagged audio signals that are associated with the particular geographic location further comprises selecting the subset of the geotagged audio signals based on the particular geographic location, and based on context data associated with the utterance.

7. The system of claim 6, wherein the context data comprises data that references a time or a date when the utterance was recorded by the mobile device, data that references a speed or an amount of motion measured by the particular mobile device when the utterance was recorded, data that references settings of the mobile device, or data that references a type of the mobile device.

8. The system of claim 1, wherein the utterance represents a voice search query, or an input to a digital dictation application or a dialog system.

9. The system of claim 1, wherein determining the particular geographic location further comprises receiving data referencing the particular geographic location from the mobile device.

10. The system of claim 1, wherein determining the particular geographic location further comprises determining a past geographic location or a default geographic location associated with the device.

11. The system of claim 1, wherein generating the noise model comprises training a Gaussian Mixture Model (GMM) using the subset of the geotagged audio signals as a training set.

12. The system of claim 1, wherein the operations further comprise:
  generating one or more candidate transcriptions of the utterance; and
  executing a search query using the one or more candidate transcriptions.

13. The system of claim 1, wherein the operations further comprise:
  processing the received geotagged audio signals to exclude portions of the environmental audio that include voices of users of the multiple mobile devices.

14. The system of claim 1, wherein the operations further comprise selecting the noise model generated for the particular geographic location from among multiple noise models generated for the multiple geographic locations.

15. The system of claim 14, wherein:
  the operations further comprise:
    defining an area surrounding the particular geographic location,
    selecting a plurality of noise models associated with geographic locations within the area from among the multiple noise models, and
    generating a weighted combination of the selected noise models; and
  the noise compensation is performed using the weighted combination of selected noise models.

16. The system of claim 1, wherein generating the noise model further comprises generating the noise model for the particular geographic location using the subset of the geotagged audio signals and using an environmental audio portion of the audio signal that corresponds to the utterance.

17. The system of claim 1, wherein selecting, as the subset of the geotagged audio signals, the geotagged audio signals that are associated with the particular geographic location further comprises:
  defining an area surrounding the particular geographic location; and
  selecting, as the subset of the geotagged audio signals, the geotagged audio signals recorded within the area.

18. A computer storage medium encoded with a computer program, the program comprising instructions that when executed by one or more computers cause the one or more computers to perform operations comprising:
  receiving an audio signal that corresponds to an utterance recorded by a particular mobile device;
  determining a particular geographic location associated with the particular mobile device;
  selecting from a set of geotagged audio signals that correspond to environmental audio recorded by multiple mobile devices in multiple geographic locations, a subset of geotagged audio signals that are associated with the particular geographic location and that were received from two or more of the multiple mobile devices within a predetermined period of time relative to when the utterance was recorded by the mobile device; and
  performing noise compensation on the audio signal that corresponds to the utterance using the subset of the geotagged audio signals.

19. The computer storage medium of claim 18, wherein the program comprising the instructions that when executed by one or more computers cause the one or more computers to perform operations further comprising:
  generating or modifying a noise model for the particular geographic location using the subset of the geotagged audio signals; and
  performing noise compensation on the audio signal that corresponds to the utterance using the noise model that has been generated or modified for the particular geographic location.

20. A computer-implemented method comprising:
  receiving an audio signal that corresponds to an utterance recorded by a particular mobile device;
  determining a particular geographic location associated with the particular mobile device;
  selecting from a set of geotagged audio signals that correspond to environmental audio recorded by multiple mobile devices in multiple geographic locations, a subset of geotagged audio signals that are associated with the particular geographic location and that were received from two or more of the multiple mobile devices within a predetermined period of time relative to when the utterance was recorded by the mobile device; and
  performing noise compensation on the audio signal that corresponds to the utterance using the subset of the geotagged audio signals.

21. The computer-implemented method of claim 20, further comprising:
  generating or modifying a noise model for the particular geographic location using the subset of the geotagged audio signals; and
  performing noise compensation on the audio signal that corresponds to the utterance using the noise model that has been generated or modified for the particular geographic location.

* * * * *